(12) United States Patent
Kumar et al.

(10) Patent No.: US 10,146,630 B1
(45) Date of Patent: Dec. 4, 2018

(54) BLOCK CHANGES FRAMEWORK FOR DELTA FILE INCREMENTAL BACKUP

(71) Applicant: EMC IP Holding Company LLC, Hopkinton, MA (US)

(72) Inventors: Kiran M V Kumar, Karnataka (IN); Kumar Srikanta, Bangalore (IN); Manjunath Jagannatha, Bangalore (IN); Ravi Shankar Panem, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 520 days.

(21) Appl. No.: 14/686,468

(22) Filed: Apr. 14, 2015

(51) Int. Cl.
*G06F 11/14* (2006.01)
*G06F 17/30* (2006.01)

(52) U.S. Cl.
CPC ...... *G06F 11/1451* (2013.01); *G06F 11/1469* (2013.01); *G06F 17/30162* (2013.01); *G06F 17/30312* (2013.01); *G06F 17/30324* (2013.01); *G06F 17/30368* (2013.01); *G06F 17/30864* (2013.01); *G06F 2201/80* (2013.01)

(58) Field of Classification Search
CPC .................................................. G06F 11/1469
See application file for complete search history.

(56) References Cited

U.S. PATENT DOCUMENTS

| | | | | |
|---|---|---|---|---|
| 8,200,637 | B1 * | 6/2012 | Stringham | G06F 11/1451 707/670 |
| 8,990,164 | B1 * | 3/2015 | Mahajan | G06F 11/1451 707/649 |
| 9,483,357 | B2 * | 11/2016 | Karonde | G06F 11/1451 |

* cited by examiner

*Primary Examiner* — Mark D Featherstone
*Assistant Examiner* — Ranjit P Doraiswamy
(74) *Attorney, Agent, or Firm* — Staniford Tomita LLP

(57) ABSTRACT

Embodiments are directed to a method of performing incremental block based backups for volume and sub-file level backups by providing a change block tracking driver component, maintaining a context of the change block tracking driver as a driver context using a single bitmap that represents the volume being tracked, and maintaining the bitmap as the only element to track changes across the volume backups and multiple application backups involving different sub-file level backups.

20 Claims, 9 Drawing Sheets

# BLOCK CHANGES FRAMEWORK FOR DELTA FILE INCREMENTAL BACKUP

CROSS-REFERENCE TO RELATED APPLICATIONS

The present application is related to U.S. patent application Ser. No. 14/686,650 filed on Apr. 14, 2015, now U.S. Pat. No. 9,996,429 issued on Jun. 12, 2018 and entitled "Mountable Container Backups For Files," U.S. patent application Ser. No. 14/686,438 filed on Apr. 14, 2015, now U.S. Pat. No. 10,114,705 issued on Oct. 30, 2018 and entitled "Presenting Virtual Machine Backup Files for Block and File Level Restore," and U.S. patent application Ser. No. 14/686,400 filed on Apr. 14, 2015, now U.S. Pat. No. 10,055,303 issued on Aug. 2, 2018 and entitled "Hyper-V Virtual Machine Block and Snapshot Consolidation," all assigned to the assignee of the present application, and each incorporated herein by reference in its entirety.

TECHNICAL FIELD

Embodiments are generally directed to networked-based data backup, and more specifically to providing a change block tracking framework for incremental backups.

BACKGROUND

Network backup methods typically utilize file image backups and/or volume image backups. File backups backup individual files, while, a volume backup backs up all data in a specified volume. Different operating systems or file systems may treat volumes differently. For example, in a Windows-based system, a volume backup stores all files and folders of the selected volume independent of their attributes (including hidden and system files), the boot record, the file allocation table (FAT) if it exists, the root and the zero track of the hard disk with the master boot record (MBR). In a Linux-based system, a volume backup stores all files and directories of the selected volume independent of their attributes, a boot record, and the file system super block. In general, however, a volume-based backup backs up all data in a specified volume to a target storage node.

Volume image backups are popular for full and incremental backups. Volume based full and incremental backups are faster than file by file. Volume backups are especially useful in high-density file system (HDFS) environments where there are millions of files to be backed up. Incremental volume block based backup are done with the help of change block tracker (CBT) component which captures changes since the last previous backup. This approach saves time and also space because only changed blocks are backed up. However there is a growing need to backup sub file changes (i.e., changes within individual files) using CBT technique at file/volume level to obtain changes respective of a file and backup only those. This type of backup would greatly improve backup time for files which are very large in size, such as database files.

What is needed, therefore, is a backup method that provides a greater deal of granularity to volume image backups by providing backups of sub-file changes.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
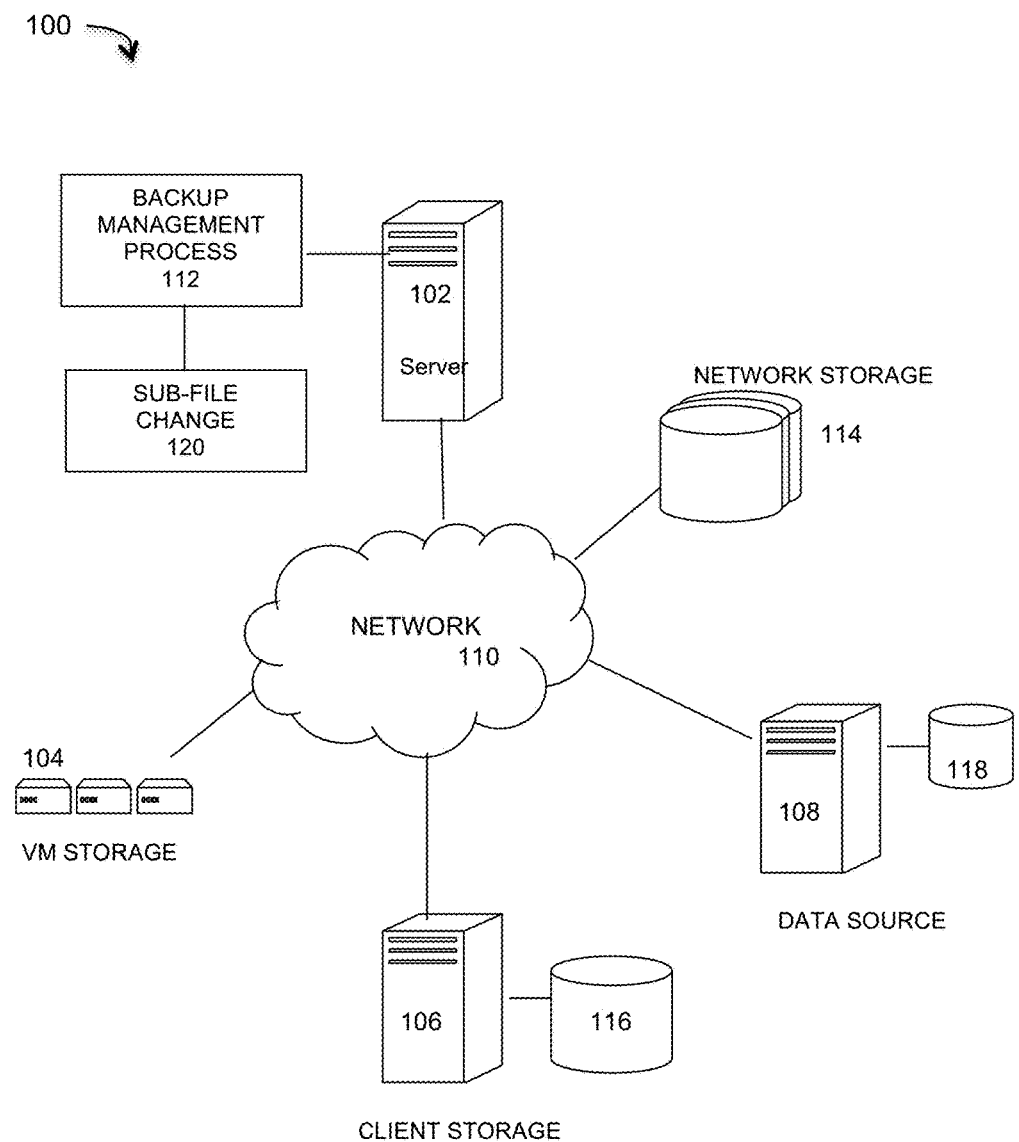
FIG. 1 is a diagram of a large-scale network implementing a sub-file changes framework for incremental backups, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a large-scale network implementing a sub-file changes framework for incremental backups, under some embodiments. In system 100, a backup server 102 executes a backup management process 112 that coordinates or manages the backup of data from one or more data sources 108 to storage devices, such as network storage 114, client storage 106, and/or virtual storage devices 104. With regard to virtual storage 114, any number of virtual machines (VMs) or groups of VMs may be provided to serve as backup targets, and the target VMs may also be organized into one or more vCenters (virtual centers) representing a physical or virtual network of many virtual machines, such as on the order of thousands of VMs each. The VMs or other network storage devices serve as target storage devices for data backed up from one or more data sources, such as computer 108, which may have attached local storage 118 or utilize networked accessed storage devices 114.

The data sourced by the data source may be any appropriate data, such as database data that is part of a database management system. In this case, the data may reside on one or more hard drives (e.g., 118) and may be stored in the database in a variety of formats. One example is an Extensible Markup Language (XML) database, which is a data persistence software system that allows data to be stored in XML format. Another example is a relational database management system (RDMS) which uses tables to store the information. Computer 108 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

A network server computer 102 is coupled directly or indirectly to the target VMs 104 and 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118). The backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices. In an embodiment, a one or more dedicated client storage machines 106 may be provided with access to local storage media 116 or an interface to the network storage 114.

For the embodiment of FIG. 1, network system 100 includes a server 102 that executes a data backup process with a functional component 120 that provide a change block tracker (CBT) framework for incremental file backups. This component 120 adds functionality that optimizes block changes for delta file incremental backup operations and allows for sub-file changes to be individually backed up.

The backup management process 112 automates the backup of network data using the target VM devices. In an embodiment, the process 112 uses certain known full and incremental backup techniques along with a process or system component 120 backs up sub-file changes by using CBT techniques at the sub-file level to improve the backup time for large files when performing backups to data storage, such as devices 104, 106, or 114.

In an embodiment, system 100 may represent a Data Domain Restorer (DDR)-based deduplication storage system with a storage server may be implemented as a DDR Deduplication Storage server provided by EMC Corporation. However, other similar backup and storage systems are also possible. System 100 may utilize certain protocol-specific namespaces that are the external interface to applications and include NFS (network file system) and CIFS (common internet file system) namespaces, as well as DD Boost provided by EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files.

For some embodiments, the backup operation that backs up the parent volume to the file may be performed using a block based backup (BBB) operation. In a block based backup, the information may be read from the parent volume block by block regardless of the number of files stored in the parent volume. The backup operation may take an image of the parent volume without having to refer to the file system associated with the parent volume.

The processes of system 100 can be used in scenarios where there is a need to backup a database (e.g., Microsoft Exchange database), or where there is an application in which it would be desirable to backup multiple files (e.g., two or more files) present in a particular folder on the source volume, and such files can be very large. The system can be used to backup data at the block-level, e.g., a block-based sub-file backup. A technique of the system provides for backing up the used blocks of a file by identifying the file extents occupied by the file. In general, a file extent is a contiguous area of storage reserved for a file in a file system, represented as a range, and any file can have zero or more extents. The file extents provide the starting offset and the length of the particular extent occupied by the file. In other specific embodiments, the system further provides for incremental backups and artificially synthesizing full backups at the file or sub-file level.

In an embodiment, techniques are provided for creating a full and incremental backup of a target file by copying all or only changed blocks of the target file into a VHD/VHDx format. The software module (e.g., backup application client module) creates data that contains all the VHD/VHDx related metadata and the disk metadata such as MBR, GPT and the file contents on the fly, which is then streamed to the backup medium such as tape or disk targets as a single data stream. The resulting save set can then be mounted which will contain the file backed up for recovery purposes. The resulting VHD/VHDx file may contain only one backed up file, which makes it easier to chain incremental backups of a particular file, which will be linked to its parent.

The backup storage server 102 includes a catalog and local backup media and/or interfaces to other VM-based backup target to store data backed up from the data source 108 or other clients. The backed up data may include a volume, portion of a volume, applications, services, user-generated or user data, logs, files, directories, databases, operating system information, configuration files, machine data, system data, and so forth. The catalog provides an index of the data stored on the backup storage server or protection storage managed by the backup storage server. The backed up data may be stored a logical entity referred to as a saveset. The catalog may include metadata associated with the backup (e.g., saveset) such as an identification of the file or files stored on the backup storage server (e.g., globally unique identifier (GUID) of a backed up database), the time and date of backup, size of the backup, path information, and so forth.

For some embodiments, one or more differential or incremental backup virtual disks may be created using the virtual disk format. The incremental backup virtual disks may be created after the creation of the file that stores the full backup information of the parent volume. The incremental backup virtual disks may store only the changed blocks in the parent volume. The set of a full backup virtual disk and one or more incremental backup virtual disks may be saved together as a single virtual disk (e.g., VHDx) in a backup medium such as disk or RAID array and can be mounted for recovery. The full backup virtual disk and the incremental backup virtual disks may be linked to their parent volume. The number of incremental backup virtual disks that can be created may be limited by the availability of system resources. Further, as the number of the incremental backup virtual disks increases, the performance of the restore operations may decrease.

The full backup information in the full backup virtual disk and the one or more incremental backup information in the incremental backup virtual disks may be merged together to form merged backup information which may then be saved in a backup medium. The merged backup information may be stored as a virtual disk and may include merged sections of the full backup virtual disk and one or more incremental backup virtual disks. In an embodiment, the backup manager process merges the base and its differencing disks on the fly (i.e., during runtime execution of the backup operations) and creates one single image stream representing the merged content. Subsequent incremental backups also can take single differencing disk or multiple differencing disks for merging and creates a link that connects to the parent backup image on the remote machine.

Figure 2:
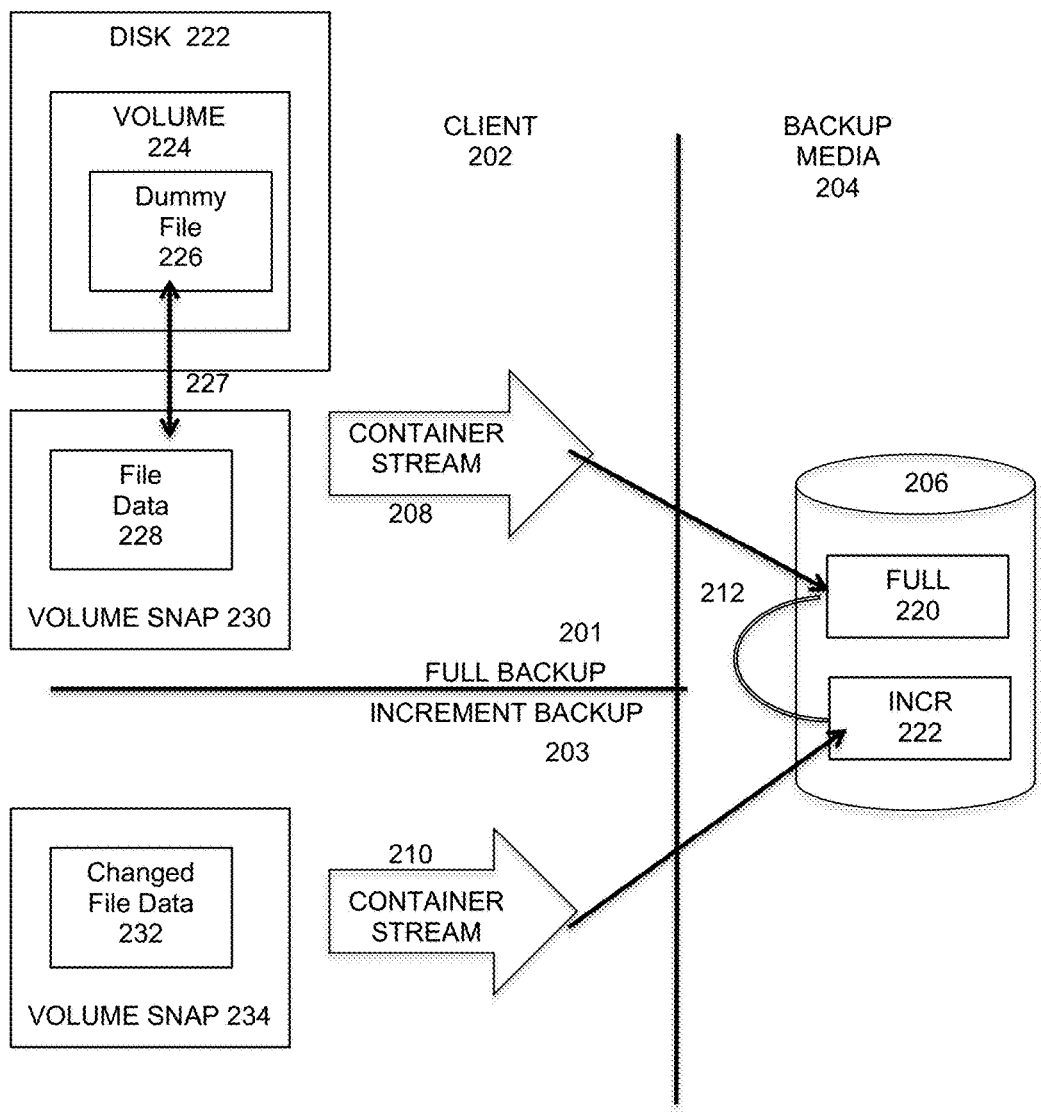
FIG. 2 is a diagram showing the overall process of a container based mountable single file backup including an incremental file backup.

Under an embodiment, the full and incremental block backups use a container-based mountable backup technique. FIG. 2 is a block diagram showing the overall process of a container based mountable single file backup including an incremental virtual file backup, under such an embodiment. As shown in FIG. 2, client 202 sources data to be backed up to backup media 204 including disk 206. At a time T0 a full backup 220 of a particular file is performed. To perform the full backup, there can be a volume snapshot 230 of the source volume that includes data of a file 228 for backup. A template or dummy virtual disk 222 is created along with a dummy volume 224 and dummy file 226. In other words, a backup volume is created on the client machine 202 with the required parameters for which the file is to be backed up. In particular, in a specific embodiment, a virtual disk of a dummy VHD/VHDx container is created at the client. An NTFS or ReFS volume is created on the disk. A dummy file 226 is created within the volume that represents the file to be backed up. The dummy file, however, is not a copy of the file to be backed up because the dummy file will not include the file data.

File blocks are redirected depending on whether the backup of a particular block is associated with metadata (e.g., virtual disk information, or volume information of the virtual disk) or actual data of the file. If the block is associated with metadata, the backup reads from the virtual disk. If the block is associated with actual file data, the read is from the source volume. The block is then streamed in a container stream 208 to the backup media 204 and stored as a full saveset 220 on drive 206. The full saveset may be referred to as a parent. During the container streaming of the VHD/VHDx container, the system interprets, analyzes, or examines a particular extent of the VHD/VHDx stream. If the particular extent is associated with the dummy file, rather than reading from the dummy file, the system reads from the file data that is residing on the volume snapshot.

A snapshot of the volume may be taken to initiate changed block tracking of the volume. After time T0, changes may be made to the file. For example, information may be added to the file, deleted or removed from the file, modified or altered in the file, or combinations of these. At a time T1, after time T0, an incremental file backup 203 is performed. To perform the incremental backup, there can be another volume snapshot 234 of the source volume that includes changed file data 232. During an incremental backup a dummy file corresponding to the file to be incrementally backed up does not have to be created because the system stores or can determine exactly where the file starts in the full or parent VHD/VHDx. In other words, the structure associated with the file has been stored in the previous full backup of the file. Thus, the data blocks to be streamed in an incremental backup can include the blocks of the file and blocks associated with metadata of the file (e.g., directory structure information, disk information, or volume information) can be excluded from the stream. The set of changed blocks since the previous backup of the file at T0 are filtered to identify changed blocks associated with the file and exclude other changed blocks of the volume not associated with the file to be backed up. The changed data blocks of the file are streamed in a container stream 210 to the backup media 204 and stored as an incremental VHD/VHDx on disk 206 in an incremental saveset 222. The incremental saveset may be referred to as a child and is linked or associated 1380 to the full or parent saveset 220.

In an embodiment, a changed block tracking driver (CBT) tracks changes to a particular volume for purposes of incremental backups. However, not all the changed blocks of a volume may relevant to an incremental backup of a particular file because the volume may include other files that have also been changed. A technique of the system identifies the blocks occupied by the particular file to be backed up and backs up only those changed blocks. Other changed blocks of the volume identified by the CBT driver that may be associated with other files not of interest may be excluded from the incremental backup of the particular file (or files) of interest. In a specific embodiment, identifying the blocks occupied by the particular file includes calling or querying an API (e.g., Windows API) to obtain the extents occupied by the particular file. The system can then perform a comparison or cross-referencing between the information returned by the API regarding the extents occupied by the particular file and the set of changed blocks of the volume identified by the changed block tracking driver to identify which changed blocks are associated with the particular file. Examples of a CBT driver that may be used is provided in greater detail below.

In a specific embodiment, a child VHD/VHDx file is created on the backup media target for the parent VHD/VHDx file which was saved during the previous full backup of the file. Blocks of the file that have changed since the last backup (e.g., last full or incremental backup) are stored as part of the child VHD/VHDx. In other words, in a specific embodiment, a method includes receiving from the CBT information identifying a set of changed blocks. The set of changed blocks are blocks on a volume that have changed since a previous backup. The previous backup may be a full or incremental backup.

The CBT tracks the changed blocks at the volume level. A subset of the set of changed blocks is identified in order to perform a backup at the file or sub-file level. More particularly, the changed blocks in the subset are changed blocks occupied by the particular file of interest on the volume to be backed up. The set of changed blocks may be filtered where the filter criteria includes information identifying blocks associated with the file of interest. Changed blocks associated with the file of interest are included in the subset of changed blocks. Changed blocks not associated with the file of interest are excluded from the subset and may not be streamed or backed up to the backup storage server. A child VHD/VHDx is created for the subset of changed blocks and chained or linked to the parent VHD/VHDx file. Consistency with respect to a particular file can be maintained because the parent (or full) saveset and child (or incremental) saveset will include blocks associated with that particular file. Blocks not associated with that particular file, such as blocks from other files not of interest, will be excluded or omitted from the parent and child savesets.

As described above, the backup management process (backup manager) 112 creates a link between the child virtual container with the parent container. In a step, the backup manager streams the child virtual container data and file data to the target (e.g., backup media). In particular, the backup manager prepares an incremental target volume stream in reference to previous backup, links to the previous backup, and places file blocks as appropriate with respect to the target stream.

Figure 3A:
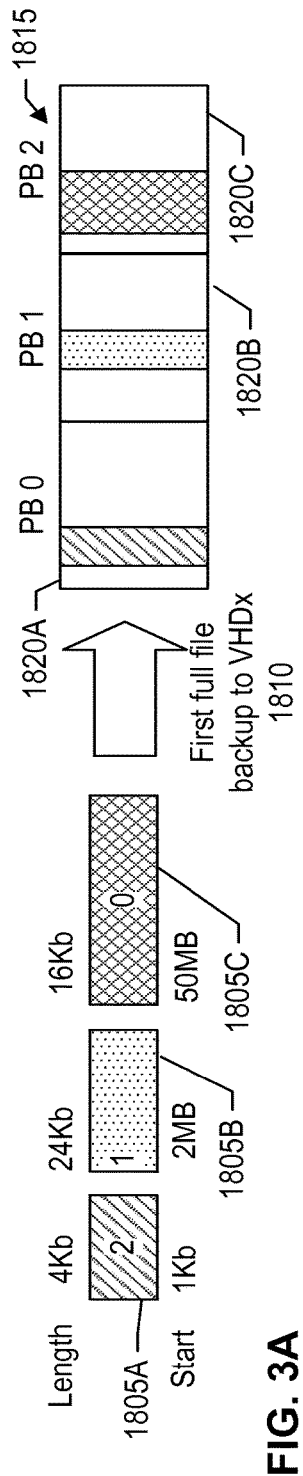
FIGS. 3A, 3B, and 3C illustrates an example full backup followed by two incremental backups as may be performed through the process of FIG. 2, under an embodiment.
Figure 3B:
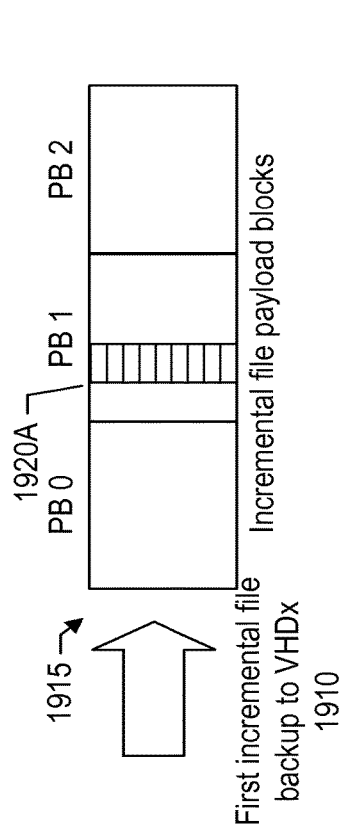
Figure 3C:
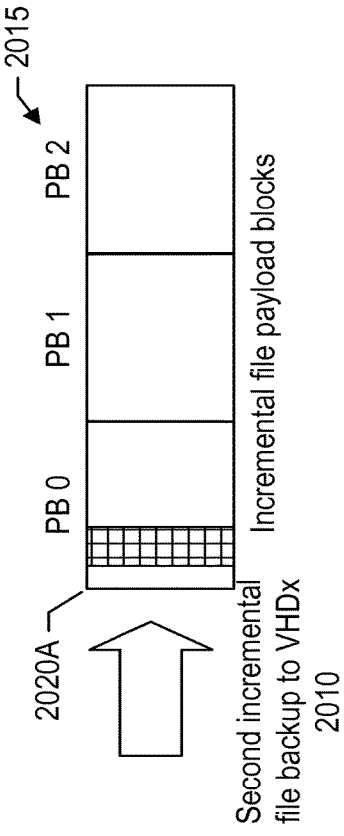

FIGS. 3A to 3C illustrates an example full backup followed by two incremental backups as may be performed through the process of FIG. 2, under an embodiment. Specifically, FIG. 3A shows a full backup of a file at a time T0. Extents 1805A, 1805B, and 1805C having starting offsets and lengths as shown in FIG. 3A have been streamed 1810 in a first full file backup to a parent VHDx file 1815. Extent 1805A has been drawn with a pattern of slanted lines. Extent 1805B has been drawn with a pattern of dots. Extent 1805C has been drawn with a pattern of cross hatches. The parent VHDx file includes a parent set of payload blocks. Extent 1805A is stored in a payload block (PB 0) 1820A of the parent. Extent 1805B is stored in a payload block (PB 1) 1820B of the parent. Extent 1805C is stored in a payload block (PB 2) 1820C of the parent.

FIG. 3B shows a first incremental backup of the file at a time T1, after time T0. An extent 1905A having a starting offset and length as shown in FIG. 19 has been streamed 1910 in a first incremental backup to a first child VHDx file 1915. Extent 1905A has been drawn with a pattern of horizontal lines. The first child VHDx file includes a first child set of payload blocks. Extent 1905A is stored in a payload block (PB 1) 1920A of the first child incremental backup.

FIG. 3C shows a second incremental backup of the file at a time T2, after times T0 and T1. An extent 2005A having a starting offset and length as shown in FIG. 20 has been streamed 2010 in a second incremental backup to a second child VHDx file 2015. Extent 2005A has been drawn with a pattern of grid lines. The second child VHDx file includes a first child set of payload blocks. Extent 2005A is stored in a payload block (PB 0) 2020A of the second child incremental backup. In the example shown in FIG. 3A, the second child incremental backup further includes extent 1805C stored in a payload block (PB 2) 2020B.

Write Tracker Driver

Embodiments of the sub-file change process employ a write tracker driver for gathering changes at the volume level. Typically a system kernel mode volume class driver is installed on the volume stack of the desired backup file system for tracking writes. This write tracker (WT) module provides interfaces to start/get bitmap and stop a backup session. The volume changes are gathered in a bitmap which is sufficient to track the entire partition/volume. After the snapshot is taken, the older changes are put in a separate bitmap and newer changes are gathered in the current bitmap. The older bitmap is then consumed by applications for backup purpose.

The write tracker driver is associated with or included in a changed block tracking (CBT) driver that is responsible for tracking the blocks that have changed in a volume since the last backup. The CBT is a driver that tracks the writes to a particular volume. The CBT driver can provide all the cumulative changes of a volume since the last backup. The CBT driver can identify, for a particular volume, the blocks that have changed since the last backup. This includes changes that include more than one file. The CBT driver can monitor changes since the last file backup. The CBT filter is responsible for filtering the set of changed blocks provided by the CBT driver in order to identify the changed blocks associated with the file or set of files to be incrementally backed up.

The execution of several applications can often cause challenges to the backup system. To serve the same bitmap for many applications, such as the file system (FS), Application A, Application B, Application C, one common technique is to create separate bitmaps for each of the application. This puts additional memory requirements on the system. Writes must be tracked to all the bitmaps during write operations on the volume, which adds additional CPU overhead. It is important to note that only one category of a certain type can be served by each write tracker bitmap i.e., separate bitmaps will have to be used for File system backups, exchange, SQL, etc.

Figure 4:
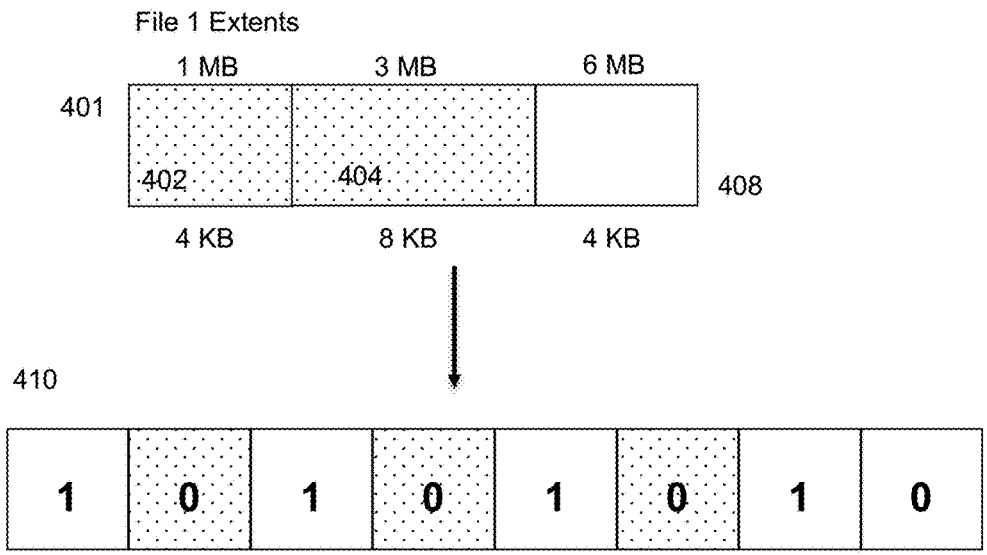
FIG. 4 illustrates an example bitmap that tracks changes to a volume, under an embodiment.

A write tracker maintains a bitmap to track changes to a volume. A used bit is denoted by 0 (as opposed to 1), and an unused block is denoted by 1. In a certain implementation, the granularity of each bit in the bitmap is 64K which is constant, but other granularities are also possible. FIG. 4 illustrates an example bitmap that tracks changes to a volume, under an embodiment. As shown in FIG. 4, a set of file blocks 401 in the source volume are mapped to bitmap 410. In this example, a first extent 402 of 1 MB is followed by a second extent 404 of 3 MB, which is followed by a third extent 408. These extents are mapped to respective fields of bitmap 410 with each field containing a 0 or 1 and the appropriate pattern for the corresponding extent.

Figure 5:
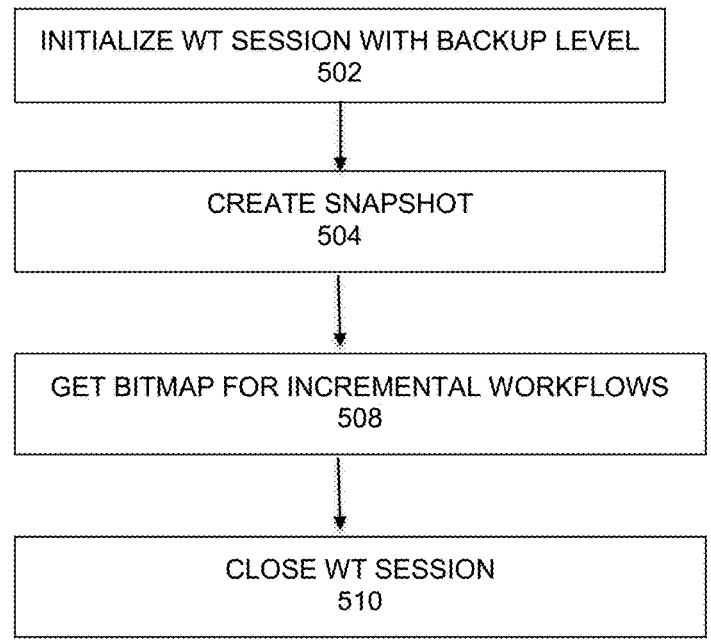
FIG. 5 is a flowchart illustrating a method of using a write tracker driver, in an example usage case.
Figure 6:
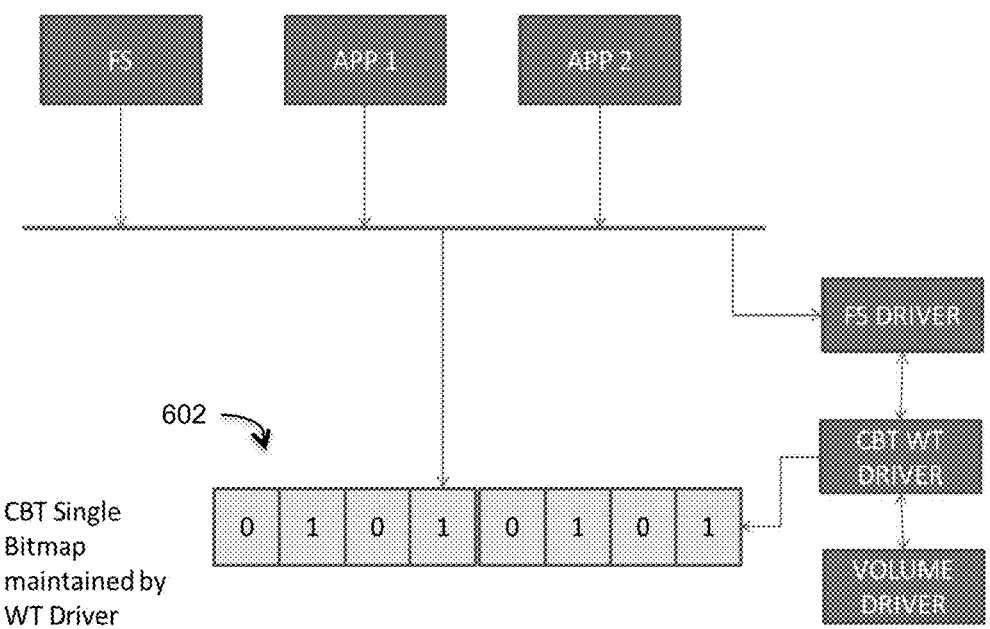
FIG. 6 illustrates a case of a change block tracking mechanism in which a single bitmap is maintained by the write tracking driver.

A typical usage of the write tracker driver is shown in the flowchart of FIG. 5. The usage begins with initializing a write tracker session with the appropriate backup level 502, then creating a snapshot of the source system, 504. The backup manager process then gets the bitmap for the incremental workflows 508. After the bitmaps are obtained, the write tracker session is closed, 510. During the time of snapshot creation the WT driver creates a new bitmap for further tracking and maintains the older bitmap to be consumed by applications via an API (e.g., GetBitmap( ) API) or similar mechanism. The new bitmap is initialized all with 1's which is unused. Since only one bitmap is maintained for tracking changes (due to memory constraints), certain problems arise. These issues include: (1) one application (e.g., Application 1) cannot reuse the older bitmap which might contain changes because it was consumed by other application like the FS BBB (block-based backup process); (2) since the new bitmap in the WT is all initialized with unused bits, any Application 2 change has also been lost; and (3) if Application 1 contains multiple files to be backed up, one file backup might fail and another might succeed. There is thus a need to isolate the write tracker for files with a single bitmap. FIG. 6 illustrates a case of a change block tracking mechanism in which a single bitmap is maintained by the write tracking driver, with reference to the example above in which the file system and two applications (Application 1 and Application 2) interact with the FS driver, CBT WT driver and volume driver through a single bitmap 602.

Figure 7A:
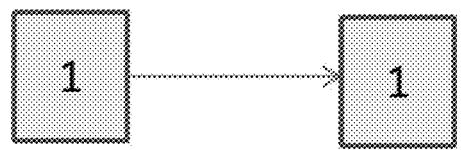
FIG. 7A illustrates the operation of a reset block, under an embodiment.
Figure 7A:
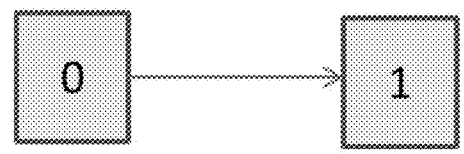

In an embodiment, the change block tracker WT for file systems and many applications uses defined reset and retain blocks that are introduced back in the driver state. Reset blocks are used to turn used blocks to unused blocks. Reset blocks are used in the case of file changes that need to be refreshed after a successful backup. To start a new incremental backup an application need to reset its file blocks back in the driver context to get new incremental changes for subsequent incremental backups, where the driver context refers to the currently tracked bitmap. FIG. 7A illustrates the operation of a reset block, under an embodiment.

Figure 7B:
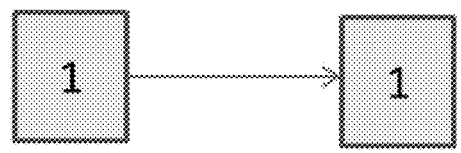
FIG. 7B illustrates the operation of a retain block, under an embodiment.
Figure 7B:

The retain blocks retain the current state of the blocks, thus used blocks remain used blocks and unused blocks remain unused. Retain blocks are used in the case of retaining file changes that belongs to some other applications during a backup. They are also used in the case of failed backups to retain file changes that belongs to same application. A FS block-based backup can query all files belonging to a volume and retain blocks back in the driver context so that used and unused blocks of files will be retained for subsequent incremental APP backups. FIG. 7B illustrates the operation of a retain block, under an embodiment.

Figure 8:
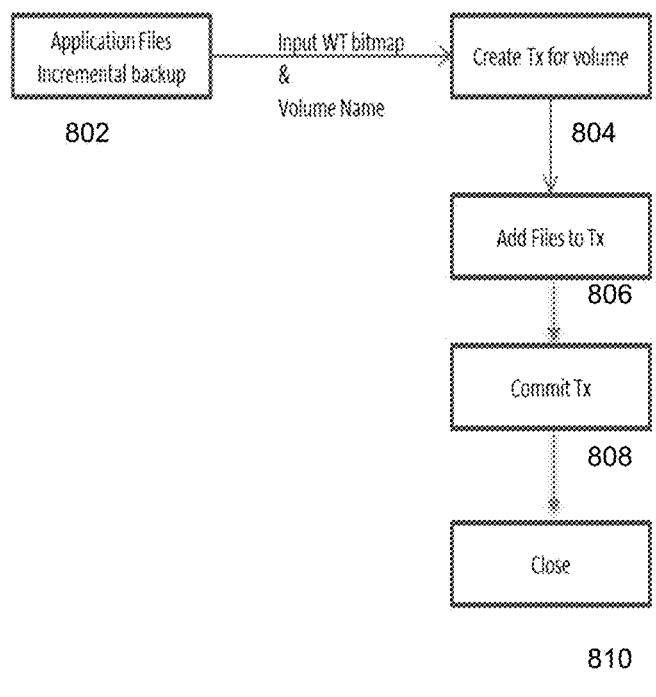
FIG. 8 is a flowchart that illustrates a method of processing a WT bitmap, under an embodiment.

FIG. 8 is a flowchart that illustrates a method of processing a WT bitmap, under an embodiment. As shown in FIG. 8, the application files incremental backup 802 are used to generate an input WT bitmap and volume name that the process uses to create a transaction (Tx) for the volume, 804. Files are then added to the transaction 806, and a commit transaction step 808 is performed before the process closes 810.

Figure 9:
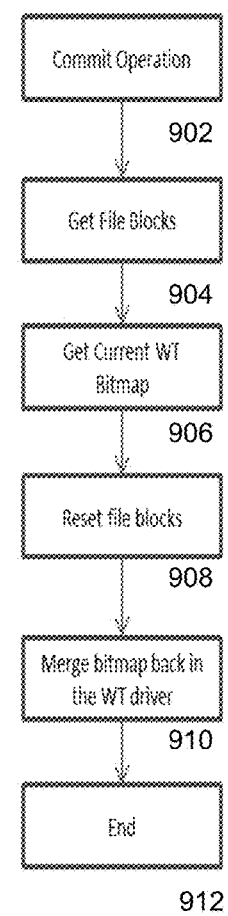
FIG. 9 is a flowchart that illustrates a method of performing a commit operation using a WT bitmap, under an embodiment.
Figure 10:
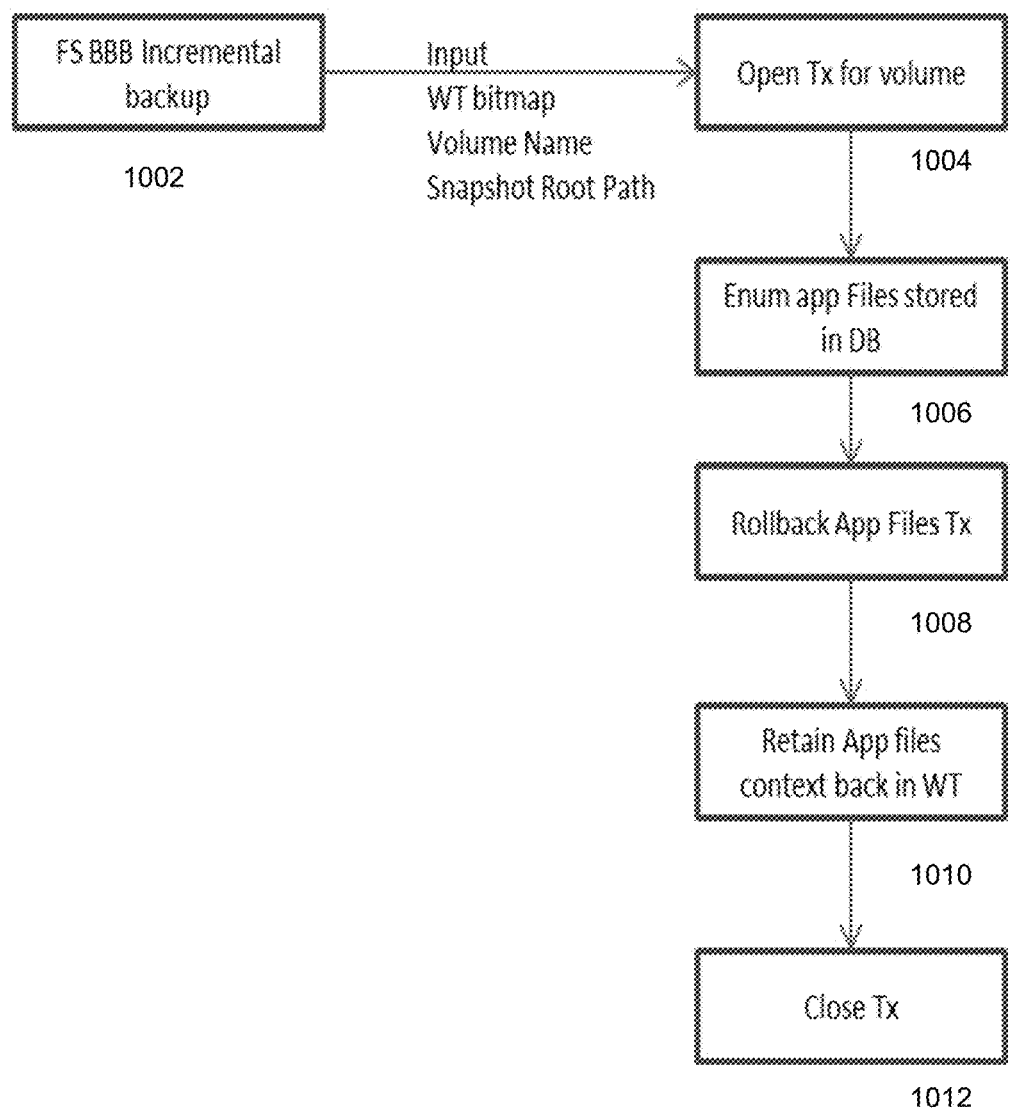
FIG. 10 is a flowchart that illustrates a method of performing a rollback operation using a WT bitmap, under an embodiment.

In an embodiment, the process 120 merges changes back in the driver bitmap context including newly reset file blocks. This represents a commit operation. An application reset's all its files into the current delta bitmap (supplied by the driver for consuming) and merges it back into the driver context. This has the effect of retaining the old context back in the driver as if no backups happened and an extra side effect of resetting all file blocks belonging to an application at that point in time. FIG. 9 is a flowchart that illustrates operation of a commit operation, under an embodiment. The process initiates the commit operation, 902 and first gets the file blocks to be backed up, 904. The process then gets the current WT bitmap, 906. It then resets the file blocks, 908, and merges the delta bitmap back into the WT driver, 910 before the process ends, 912. The delta bitmap represents the bits that correspond to the file being backed up. After a successful back up, bits corresponding to the file need to be brought back into the driver context, to be used later by volume level backup, or in case the same file is part of some other application backup.

The process 120 also merges the fresh bitmap in the driver bitmap context including application's state context. This represents a rollback operation. In this case, the file system backup retains all application files back in the current driver state including fresh state to further capture file system changes. It rolls back all application files changes back in the driver context. This has the effect of maintaining a state as if no application backup happened. The next time when Application A queries for changes belonging to its files it will find those file changes in that context. FIG. 8 is a flowchart that illustrates a method of processing a WT bitmap in a rollback operation, under an embodiment. As shown in FIG. 8, the file system BBB incremental backup 1002 is used to generate an input WT bitmap, volume name, and snapshot root path that the process uses to create a transaction (Tx) for the volume, 1004. Enumerated application files are then stored in the database, 1006. The process then performs a rollback of the application files, 1008, and retains the application file context back in the write tracker, 1010, before the transaction is closed, 1012.

Figure 11:
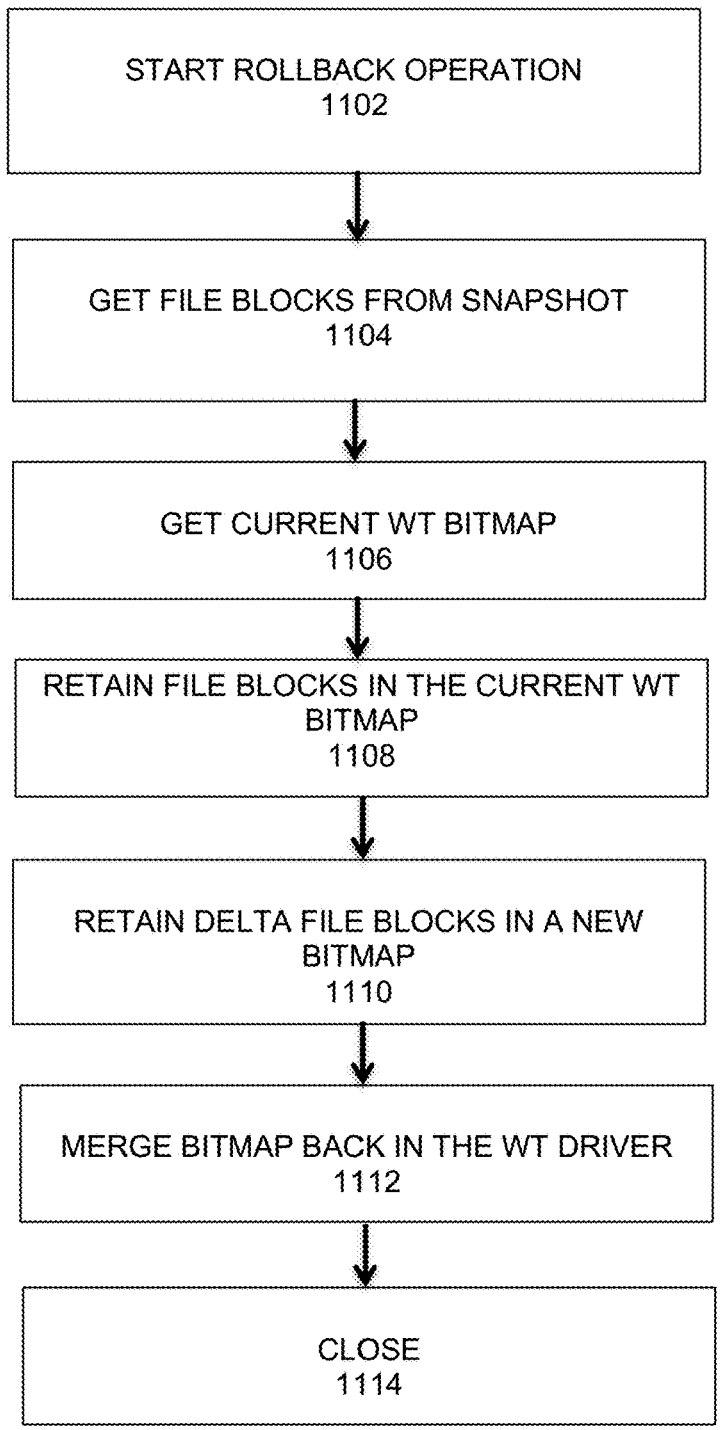
FIG. 11 is a flowchart that illustrates a method of merging a WT bitmap in a WT driver, under an embodiment.

FIG. 11 is a flowchart that illustrates a rollback operation, under an embodiment. The process initiates the rollback operation, 1102 and first gets the file blocks from the snapshot, 1104. The process then gets the current WT bitmap, 1106. It then retains the file blocks in the current WT bitmap, 1108. The process retains the delta file blocks in a new bitmap, 1110, and merges the bitmap back into the WT driver, 1112 before the process ends, 1114.

The process 120 further performs a merge of the bitmap operation in the driver bitmap context. The merge operation is performed by sending a user supplied bitmap buffer which the driver merges the current bitmap and the user supplied bitmap. The application supplied buffer can be used to reset or retain file blocks in the bitmap. Thus, under this process, after a start command the process resets/retains bits in the bitmap. It then performs a merge of the bitmap, and then the process ends.

In an embodiment, a persistent store database is used to maintain file blocks that can be used by other applications to reset/retain file blocks. In an example implementation, a SQLite (or similar) database is used for persistence to maintain files related to applications in a volume. Two new tables are defined for use in this database. The first is an extents table that stores file extents, which are then used to reset/retain by FS and the applications. The second is a AppFileSet table that stores files indexed with an ID which is unique to a volume. This table can also be used to detect file renames, path changes across incremental file backups.

The process 120 provides several advantages over present systems. These include the fact that a single bitmap is used so less memory resources are required, each application can maintain its own state, and each application can rollback its changes into the driver context if the backup fails thereby enabling subsequent backups to restart from where it was left out, Embodiments thus provide a computer-implemented method for performing incremental block based backups for volume and/or sub-file level backups by providing a change block tracking driver component, maintaining a context of the change block tracking driver as a driver context using a single bitmap that represents the volume being tracked, and maintaining the bitmap as the only element to track changes across the volume backups and multiple application backups involving different sub-file level backups.

Change Block Tracking Driver

As stated above, embodiments employ a CBT driver that tracks the changed blocks at the volume level. A subset of the set of changed blocks is identified in order to perform a backup at the file or sub-file level. More particularly, the changed blocks in the subset are changed blocks occupied by the particular file of interest on the volume to be backed up. The set of changed blocks may be filtered where the filter criteria includes information identifying blocks associated with the file of interest. Changed blocks associated with the file of interest are included in the subset of changed blocks. Changed blocks not associated with the file of interest are excluded from the subset and may not be streamed or backed up to the backup storage server. In a virtual system, a child VHD/VHDx is created for the subset of changed blocks and chained or linked to the parent VHD/VHDx file. Consistency with respect to a particular file can be maintained because the parent (or full) saveset and child (or incremental) saveset will include blocks associated with that particular file. Blocks not associated with that particular file, such as blocks from other files not of interest, will be excluded or omitted from the parent and child savesets.

The backup management process (backup manager) 112 may create a link between the child virtual container with the parent container. In a step, the backup manager streams the child virtual container data and file data to the target (e.g., backup media). In particular, the backup manager prepares an incremental target volume stream in reference to previous backup, links to the previous backup, and places file blocks as appropriate with respect to the target stream.

As described above, embodiments employ a CBT driver for tracking block level writes for incremental backup. In general, block level backups require some kind of changed block tracking mechanism across various points in time. In a Windows OS system, this is usually accomplished by registering an upper filter driver to volume class devices. Once registered, the write tracking driver monitors writes coming through its filter device object and maintains a bitmap of blocks that have changed from a particular point in time. However, this approach requires target system to be rebooted for the filter driver to successfully attach to all volume device stacks that were already built prior to registering the filter; for example, the system boot volume is a boot time PnP stack. Hence this requires downtime for a production server, which could be hosting mission critical applications and workloads. Since the advent of VSS on windows (Volume Shadow copy service), block based backup applications typically take a VSS snapshot of the source volume and perform block level image backup from it. VSS framework introduces additional complexities for incremental backup by allowing VSS writers to make changes to the point in time snapshots by issuing writes to it. This is done so that the point in time data in the snapshot is application level consistent. Furthermore, the capability of excluding files from the snapshot is critical for any host based block level backup solution in order to avoid backing up files which are not needed. Files such as pagefile.sys, hiberfile.sys, registry transaction logs etc. are examples of such files. These files can be deleted from the snapshot by a custom VSS writer which in its OnPostSnapshot( ) event callback issues DeleteFile API on all such files using a pathname prefixed by the shadow copy device name. DeleteFile on the VSS snapshot from inside the OnPostSnapshot event callback effectively issues writes to the shadow copy and marks the file as deleted and frees up the blocks occupied by them.

The CBT used in an embodiment of system 100 provides a method of tracking block level writes for host based, block level incremental backups that does not require a reboot of the machine and at the same time gives the capability of excluding files from the backup by monitoring writes happening on the snapshot device. This component patches the IRP dispatch table of volsnap.sys driver on a system that is up and running. This is done by atomically replacing the original IRP_MJ_WRITE and IRP_MJ_DEVICE_CONTROL handlers of volsnap.sys with an alternate set of IRP_MJ_WRITE and IRP_MJ_DEVICE_CONTROL handlers. The alternate IRP_MJ_WRITE handler is responsible for tracking changed blocks while the alternate IRP_MJ_DEVICE_CONTROL handler is responsible for switching the changed block bitmaps across various points in time. These "points in time" are defined by an incoming IOCTL_VOLSNAP_FLUSH_AND_HOLD_WRITES against a volume device. Once the filter is in place, it starts tracking changed blocks on the very first FLUSH_AND_HOLD_WRITES and then switches CBT (change block tracking) buffers on the subsequent FLUSH_AND_HOLD_WRITES. The previous incremental CBT buffer is purged after being consumed by user mode backup application. The user mode backup application creates a base parent VHD (virtual hard disk) out of this first snapshot while subsequent snapshots are used (along with the CBT data from the filter driver) to create incremental child VHDs. The following outline lists the functional steps for this method:

(1) On a live system which is up and running, register driver's service entry and start the driver using SCM APIs (Service Control Manager)
(2) Entry point of the driver registers a controller device object for communication with the user mode.
(3) At the time of first full backup, the user mode application issues WT_PATCH IOCTL
(4) CBT driver references volsnap.sys driver by name and retrieves a pointer to the corresponding driver object using the function ObReferenceObjectByName
(5) Once pointer to volsnap's driver object is retrieved, the original IRP_MJ_WRITE and IRP_MJ_DEVICE_CONTROL handlers, for volsnap's driver object, are saved in global variables
(6) The dispatch table of volsnap's driver object is then patched atomically using InterlockedExchangePointer
(7) The reference on volsnap's driver object is immediately removed using ObDereferenceObject At this point, the CBT driver starts receiving IRP_MJ_WRITE and IRP_MJ_DEVICE_CONTROL IRPs for all registered volumes on the system via the patched IRP_MJ_WRITE and IRP_MJ_DEVICE_CONTROL handlers. Both of these (patched handlers i.e.) eventually call the original (saved) IRP_MJ_WRITE and IRP_MJ_DEVICE_CONTROL handlers, without fail. While the alternate patched handlers are executing the CBT driver maintain a global "IRP entry count" that is incremented/decremented on entry/exit, respectively, to the patched write/device control handler. When changed block tracking is no longer needed and/or needs to be stopped, the patch is replaced with the original handlers. Driver-unload routine and/or the WT_UNPATCH IOCTL handler, restores the original saved handlers, again atomically, using InterlockedExchangePointer and waits for the global "IRP entry count" to drop to zero before returning from the unload routine. This ensures that the CBT driver is not unloaded from the memory while the alternate handlers are executing. In this method we exclusively choose volsnap.sys as the driver whose dispatch table is patched. This needs to be done to ensure that the CBT driver is in the path to writes as they flow down the volume device stack and at the same time ensures that it would receive IOCTL_VOLSNAP_FLUSH_AND_HOLD_WRITES which is required for switching the incremental bitmap. In the volume device stack, IOCTL_VOLSNAP_FLUSH_AND_HOLD_WRITES does not go beyond volsnap.sys. Furthermore, snapshot device objects are named objects and are directly created by volsnap.sys. By patching the write handler of volsnap.sys we also ensure that the writes happening on the snapshot device would be monitored which brings us to the final logic which the CBT driver implements, and that is of detecting snapshot devices. Once the dispatch table of volsnap.sys is patched, the CBT driver starts receiving write and device control IRPs for ALL devices created by volsnap.sys. Snapshot devices, created by volsnap.sys, are named device objects. Their names are prefixed with "HardDiskShadowCopy" string. After the patch is administered, the driver marks each device object that it detects via either of its alternate IRP_MJ_WRITE and IRP_MJ_DEVICE_CONTROL handlers in a simple linked list. Before adding a device object to the list, it queries the operating system on, if the corresponding device object has a name. In the volume device stack the filter device object created by volsnap.sys are not named while their counterparts in the shadow copy device stack are named like mentioned above (HardDiskShadowCopy). By making use of the object manager API ObQueryNameString( ) against the target device object and then matching the output buffer for the signature "HardDiskShadowCopy", the driver is able to detect if the device object is for a snapshot device. Once detected, the driver marks it as a snapshot device and maintains a separate bitmap for tracking writes to it. Additionally, only those snapshot devices which are created under the context of the backup applications; are marked for tracking writes. These writes would be the result of application writers attempting to alter the snapshot in order to make the snapshot data application consistent as well as include writes originating from the OnPostSnapshot event of the backup application's writer for deleting/excluding files from the snapshot. The incremental bitmap for a particular level is then constructed by merging the bitmaps obtained from volume as well as the snapshot device.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for performing incremental block based backups for volume and sub-file level backups, comprising:
   providing a change block tracking driver component that has a write handler component tracking changed blocks and a device control handler switching changed block bitmaps across various points in times defined by incoming writes against a volume device allowing tracking of block level writes for incremental backups without requiring a target system to be rebooted for a filter driver to successfully attach to all volume device stacks built prior to registering the filter to prevent downtime for a production server serving the target system;
   maintaining a context of the change block tracking driver as a driver context using a single bitmap that represents the volume being tracked;
   maintaining the bitmap as the only element to track changes across the volume backups and multiple application backups of multiple applications involving different sub-file level backups; and
   maintaining a persistent store database for file blocks used by each application of the multiple applications and having an extents table and a file system index table to allow each application of the multiple applications to maintain a respective state and rollback respective changes into the driver context.

2. The method of claim 1 wherein the backup comprises an incremental backup, the method further comprising starting a new incremental backup by causing an application of the multiple applications to reset blocks of the file back in the driver context to obtain new incremental changes for subsequent incremental backups, the method further comprising
   registering an upper filter driver to volume class devices;
   tracking changed blocks on a first flush and hold write operation;
   switching change block tracking buffers on subsequent flush and hold write operations; and
   purging the first flush and hold write operation.

3. The method of claim 2 further comprising maintaining retain blocks that allow a file system process to query all files belonging to a volume containing the file in the driver context to retain file changes that belong to the application.

4. The method of claim 3 wherein the retain blocks facilitate used and unused blocks of files to be retained for the subsequent incremental backups.

5. The method of claim 3 wherein the driver context comprises a write tracker driver context, represented by a bitmap corresponding to the volume being tracked.

6. The method of claim 5 wherein the change block tracking driver is part of a process that tracks changes in the volume containing the file or sub-file changes that are changes of a granularity smaller than an individual file.

7. The method of claim 6 further comprising:
   resetting all files of the application into a current state of a delta bitmap, the delta bitmap containing bits that correspond to the file being backed up; and
   merging the delta bitmap into the driver context.

8. The method of claim 6 further comprising, for a file system level backup:
   retaining all files of the application in a current driver state to capture file system changes; and
   rolling back all files to the driver context.

9. The method of claim 7 wherein the step of merging the delta bitmap comprises:
   merging, through the driver, a current bitmap and a user supplied bitmap; and
   resetting file blocks in the merged bitmap.

10. The method of claim 9 wherein the user supplied bitmap is provided through a user supplied bitmap buffer, and an application supplied buffer is used to perform the resetting file blocks.

11. The method of claim 6 further comprising:
    providing an extents table to store file extents of the file; and
    providing an application file table that stores files indexed with associated identifiers that are unique to a volume.

12. A system configured to perform incremental block based backups for volume and sub-file level backups in a backup storage network, the system comprising:
    a change block tracking (CBT) driver component executed as a software program by an operating system of a host computer in the backup storage network and having a write handler component tracking changed blocks and a device control handler switching changed block bitmaps across various points in times defined by incoming writes against a volume device allowing tracking of block level writes for incremental backups without requiring a target system to be rebooted for a filter driver to successfully attach to all volume device stacks built prior to registering the filter to prevent downtime for a production server serving the target system;
    a first executable component of the CBT driver maintaining a context of the change block tracking driver as a driver context using a single bitmap that represents the volume being tracked;
    a second executable component of the CBT driver maintaining the bitmap as the only element to track changes across the volume backups and multiple application backups of multiple applications involving different sub-file level backups; and a persistent store database accessed by the CBT driver and storing file blocks used by each application of the multiple applications and having an extents table and a file system index table to allow each application of the multiple applications to maintain a respective state and rollback respective changes into the driver context.

13. The system of claim 12 wherein the backup comprises an incremental backup, the system further comprising a third component starting a new incremental backup by causing an application to reset blocks of the file back in the driver context to obtain new incremental changes for subsequent incremental backups, by:
   registering an upper filter driver to volume class devices;
   tracking changed blocks on a first flush and hold write operation;
   switching change block tracking buffers on subsequent flush and hold write operations; and
   purging the first flush and hold write operation.

14. The system of claim 13 wherein retain blocks are maintained that allow a file system process to query all files belonging to a volume containing the file in the driver context to retain file changes that belong to the application.

15. The system of claim 14 wherein the retain blocks facilitate used and unused blocks of files to be retained for the subsequent incremental backups.

16. The system of claim 15 further comprising an additional component resetting all files of the application into a current state of a delta bitmap, the delta bitmap containing bits that correspond to the file being backed up, and merging the delta bitmap into the driver context.

17. The system of claim 16 wherein, for a file system level backup, at least one component retains all files of the application in a current driver state to capture file system changes, and rolls back all files to the driver context.

18. The system of claim 17 wherein merging the delta bitmap comprises merging, through the driver, a current bitmap and a user supplied bitmap, and resetting file blocks in the merged bitmap.

19. A computer program product, comprising a non-transitory computer-readable medium having a computer-readable program code embodied therein, the computer-readable program code adapted to be executed by one or more processors to perform incremental block based backups for volume and sub-file level backups by executing instructions implementing a method comprising:
   providing a change block tracking driver component that has a write handler component tracking changed blocks and a device control handler switching changed block bitmaps across various points in times defined by incoming writes against a volume device allowing tracking of block level writes for incremental backups without requiring a target system to be rebooted for a filter driver to successfully attach to all volume device stacks built prior to registering the filter to prevent downtime for a production server serving the target system;
   maintaining a context of the change block tracking driver as a driver context using a single bitmap that represents the volume being tracked;
   maintaining the bitmap as the only element to track changes across the volume backups and multiple application backups of multiple applications involving different sub-file level backups; and
   maintaining a persistent store database for file blocks used by each application of the multiple applications and having an extents table and a file system index table to allow each application of the multiple applications to maintain a respective state and rollback respective changes into the driver context.

20. The computer program product of claim 19 wherein the backup comprises an incremental backup, the method further comprising starting a new incremental backup by causing an application of the multiple applications to reset blocks of the file back in the driver context to obtain new incremental changes for subsequent incremental backups, the method further comprising
   registering an upper filter driver to volume class devices;
   tracking changed blocks on a first flush and hold write operation;
   switching change block tracking buffers on subsequent flush and hold write operations; and
   purging the first flush and hold write operation.

* * * * *